United States Patent

Drucker

[15] 3,676,723
[45] July 11, 1972

[54] HIGH SPEED CENTRIFUGE DRIVE ASSEMBLY

[72] Inventor: Kenneth G. Drucker, Astoria, Oreg.
[73] Assignee: Bio-Consultants, Inc., South Gate, Calif.
[22] Filed: March 2, 1970
[21] Appl. No.: 15,761

[52] U.S. Cl. ........................... 310/68 B, 200/61.45, 233/23,
    310/157, 318/466, 318/489
[51] Int. Cl. .......................................... H02k 11/00
[58] Field of Search ............. 310/68.1, 68.2, 68.3, 66, 91,
    310/157, 51, 68.5; 318/460, 462, 466, 489, 128;
    233/23, 23 A; 64/11; 200/79, 61.45, 61.46, 61.52

[56] References Cited

UNITED STATES PATENTS

| | | | |
|---|---|---|---|
| 2,827,229 | 3/1958 | Blum | 233/23 |
| 3,322,338 | 5/1967 | Stallman et al. | 233/23 |
| 2,725,188 | 11/1955 | Scott | 233/23 |
| 770,385 | 9/1904 | Pott et al. | 233/23 A |
| 1,824,722 | 9/1931 | Jones | 233/23 |
| 2,431,316 | 11/1947 | Dudley et al. | 310/68 B |
| 3,226,016 | 12/1965 | Coupel et al. | 233/23 A |

Primary Examiner—D. F. Duggan
Assistant Examiner—B. A. Reynolds
Attorney—Jessup & Beecher

[57] ABSTRACT

A drive assembly for a motor driven centrifuge, or other rotatable mechanisms, is provided which includes a resilient rotatably driven spindle. The rotating spindle and centrifuge rotor normally create gyroscopic effects so that the rotor is rotated with minimal radial vibration about a mass center, even in the presence of some unbalancing of the rotor assembly. The apparatus also includes contact means associated with the spindle for providing a desired electrical control signal should the rotor unbalancing exceed a safe threshold. The control signal is used normally to de-energize the drive motor and to cause the rotor to stop.

9 Claims, 4 Drawing Figures

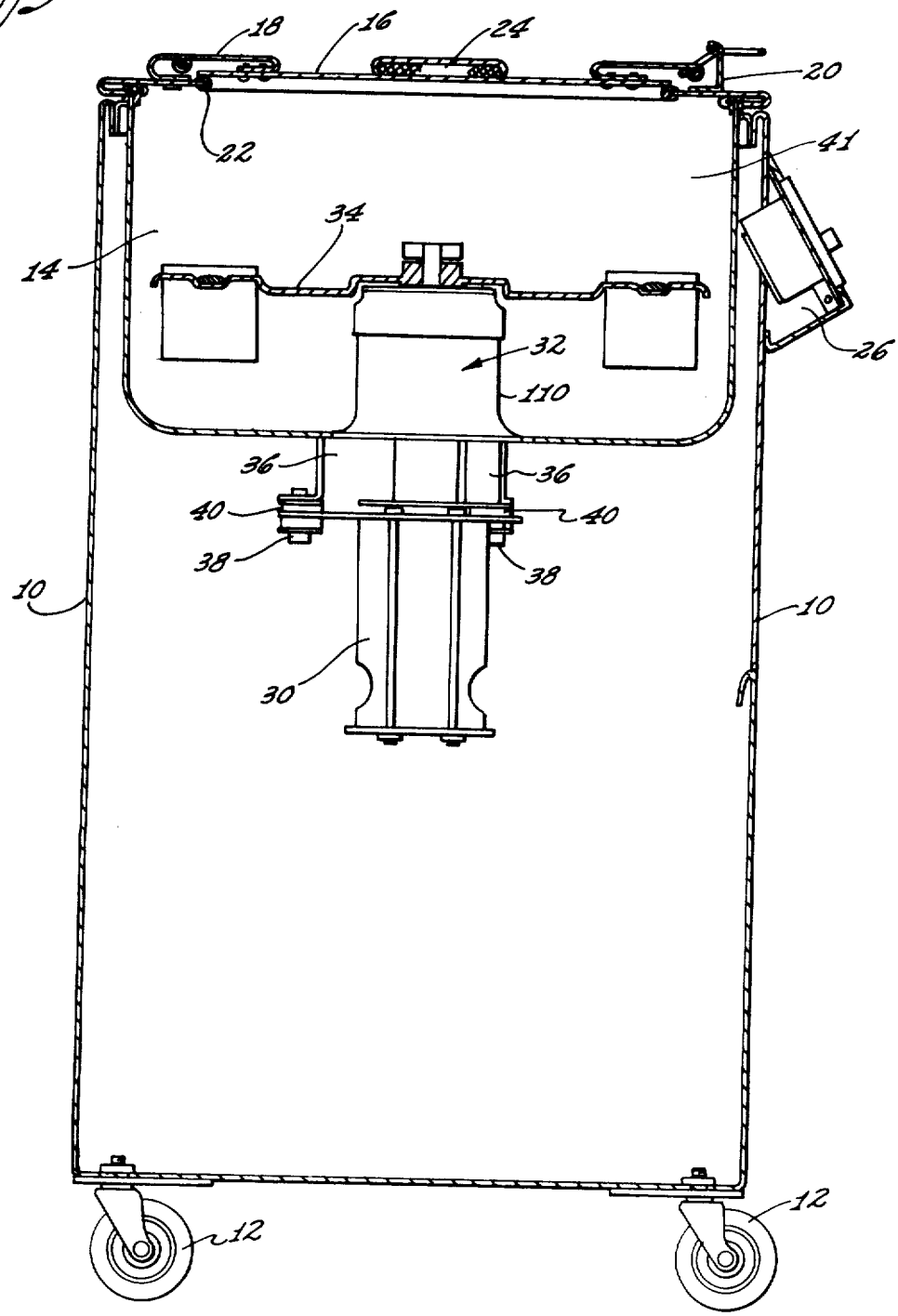

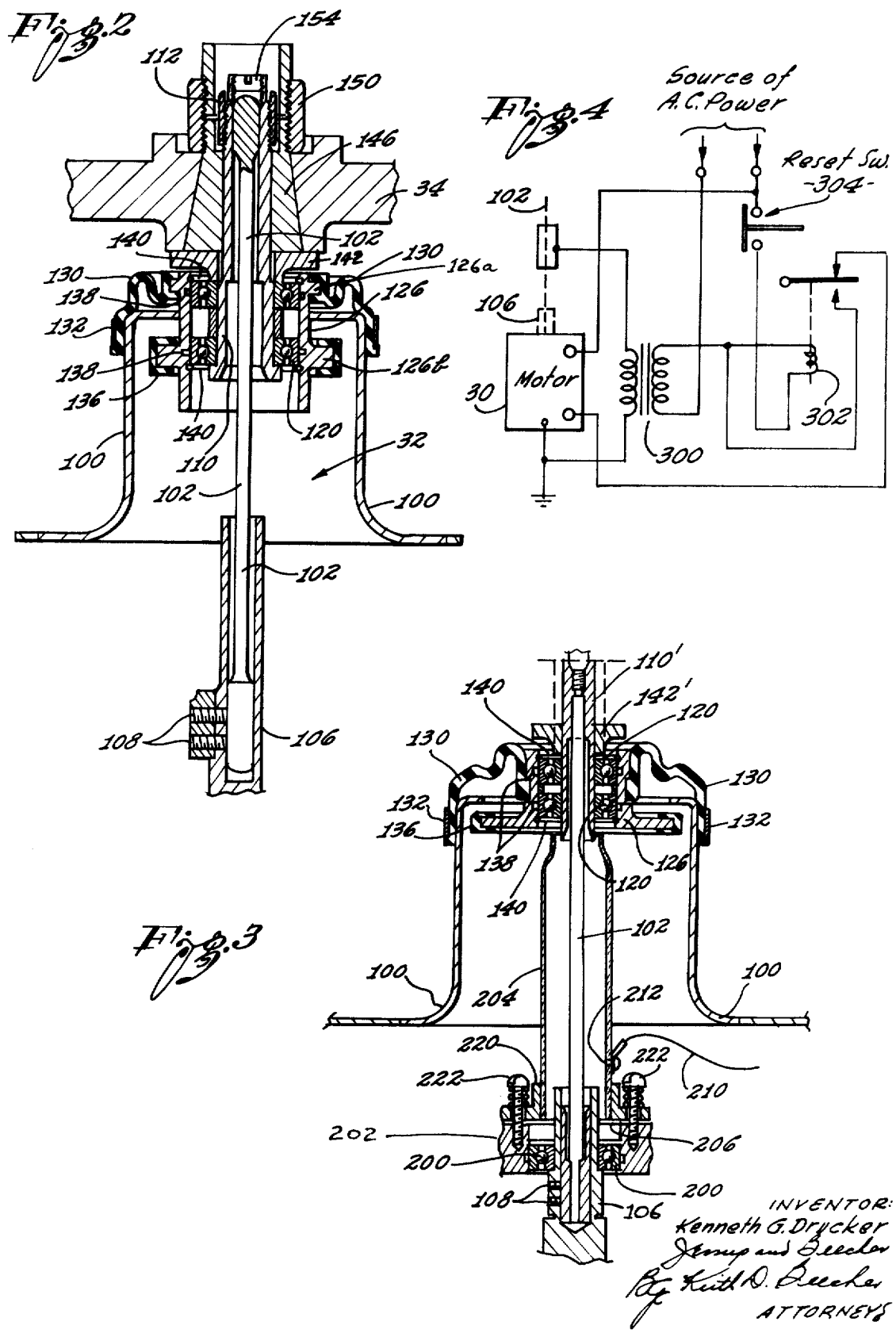

HIGH SPEED CENTRIFUGE DRIVE ASSEMBLY

BACKGROUND OF THE INVENTION

As mentioned, for example, in U.S. Pat. No. 2,827,229, a critical problem in the construction of electric motor driven centrifuges lies in providing for safely balancing the rotating rotor head of the centrifuge. For example, in the prior art structures, the rotor of the centrifuge including the rotating head, must be concentrically balanced within severe tolerances so that the rotational axis of the rotor may closely coincide with its geometrical axis. When the prior art rigid couplings are used in the rotor drive construction, the slightest departure from ideal rotor balance produces substantial stress and strain on the bearings and drive shaft of the apparatus when the rotor assembly is driven at relatively high speed.

As also pointed out in the aforesaid United States patent, it is a well known fact that a rotating, rigid body, if freely suspended, tries to rotate about an axis through the center of gravity of the body. Thus, if a perfectly machined and dynamically balanced rotor were spun about its axis, a smooth running condition without vibration is theoretically obtainable. If, however, a weight is added to a certain portion of the rotor, the center of gravity of the overall assembly is displaced laterally from the geometrical axis, and as a result the rotor now spins about a new axis passing through a new center of gravity.

In the prior art assemblies, even if the rotor is unbalanced only to a small degree, violent vibrations will be produced not only in the rotor, but also in its mounting and in the drive motor as well, as the rotor comes up to speed. If the prior art apparatus is permitted to continue operating under such a condition for any length of time, the mountings will be destroyed, and there also is a possibility of the apparatus throwing itself to pieces and thereby endangering the safety of anyone in the vicinity and damaging the surrounding property.

In an attempt to reduce such rotor vibrations, a compound flexible coupling system is provided in the mechanism described in the aforesaid patent for coupling for the rotor and for the rotor drive shaft. This is so that the drive shaft may perform as an articulating drive between an unbalanced rotor and a stationary motor base assembly, thereby permitting the geometric axis of the rotor to describe its natural dynamic axis in an orbital path.

A like effect is provided in the mechanism of the present invention by the provision of a resilient spindle in the drive assembly. Then, in the presence of slight unbalances in the rotating motor, the resilient spindle assumes an S shape. This is because the gyroscopic effect causes the rotor to spin about an axis passing through the center of gravity of the rotor, and this spinning is accomplished with minimal vibration. Should the rotor unbalance become too pronounced in the mechanism of the invention, an electric contact is established from which a control may be derived for quickly de-energizing the drive motor and causing the rotor to come to a halt.

BRIEF DESCRIPTION OF THE DRAWINGS

FIG. 1 is a side sectional view of a high speed motor driven centrifuge which may incorporate the concepts and teachings of the present invention;

FIG. 2 is a side sectional view of a portion of the mechanism of FIG. 1 and constructed in accordance with one embodiment of the invention;

FIG. 3 is a view like FIG. 2, and representing a slightly modified embodiment with respect to the mechanism of FIG. 2; and FIG. 4 is a circuit diagram of a suitable electrical control system for use in conjunction with the mechanisms of FIGS. 2 and 3.

DETAILED DESCRIPTION OF THE ILLUSTRATED EMBODIMENTS

As shown in FIG. 1, for example, the centrifuge assembly may include a cabinet 10 which also serves as a frame for supporting the various components of the assembly. As illustrated, the cabinet may conveniently be supported on wheels, such as the wheels 12. A housing 14 is supported within the cabinet 10, and the housing 14 provides an inner compartment for the apparatus. The housing 14 may, for example, be welded to the upper rim of the cabinet 10.

An access lid 16 may be hinged over the top of the housing 14, as shown. The lid 16 is hinged by an appropriate hinge 18, and it may be latched in place by an appropriate latch mechanism 20. An annular seal 22 is provided around the upper rim of the assembly so that the lid is tightly sealed in place when it is closed and latched. An appropriate air filter 24 may be provided on the lid 16. A control panel 26 is mounted on one side of the cabinet 10, and usual controls, including speed and timer controls are mounted on the control panel 26.

The bottom of the housing 14 may provide an appropriate mounting frame for an electric motor 30 and drive assembly 32. The drive assembly 32 will be described in some detail subsequently, and it serves to couple the electric motor 30 to the centrifuge head 34. As shown, the motor is suspended from the lower side of the housing 14 on hanger brackets 36, and is secured to the brackets by fasteners 38 which extend through appropriate rubber bushing vibration dampeners 40.

It will become apparent as the description proceeds that the structure shown in FIG. 1 represents but one appropriate type of apparatus in which the drive assembly of the present invention may be incorporated, and that the drive may be included in any apparatus in which a rotor is to be rotatably driven.

As shown, for example, in FIG. 2, the drive assembly 32 includes an elongated resilient spindle 102 composed, for example, of an appropriate alloy such as "UNIMAR" or any other appropriate material exhibiting high strength and good resiliency characteristics may be used. The upper end of the drive shaft 106 from the motor 30 may be tubular, as shown, and the lower end of the spindle 102 may extend down into the motor drive shaft to be secured thereto by means, for example, of set screws 108. The lower end of the spindle 102 may have a rectangular configuration, as may the inner bore of the drive shaft 106, and the lower end of the spindle may be enlarged with respect to the remaining part of the spindle, as shown.

The spindle 102 extends vertically upwardly from the motor, and through the tubular bushing 100. A tubular drive shaft 110 is mounted on the upper end of the spindle 102, and the drive shaft 110 extends along the spindle, as shown, in coaxial relationship with the spindle and spaced radially therefrom. The upper end of the tubular shaft 110 has a tapered thread, and a nut 112 is threaded down over the tubular shaft 110, so as to bring the upper end of the tubular shaft 110 into a press-fit with the enlarged upper extremity of the spindle 102.

The tubular shaft 110 is rotatably supported in bearings 120 which, in turn, are mounted to the tubular bushing 100. The bearings 120 may be, for example, New Departure bearings, or any other suitable type. The bearings 120 include a tubular retainer 126 which has a pair of shoulders 126a and 126b formed on the outer peripheral surface and spaced axially from one another, as shown.

A flexible seal 130 is attached to the upper shoulder 126 and is held on the upper end of the bushing 100 by means of a band 132. The seal 130 serves as a dampener for the bearing, and it also serves to seal the interior of the housing 14 from hot air which emanates, for example, in the motor 30. The seal 130 also serves to prevent any chemicals which might be spilled in the housing 14 from injuring the interior of the bushing or into the motor assembly. The lower annular shoulder 126b supports an annular rubber bumper 136. Appropriate O-rings 138 are provided in the bearing assembly, as shown. Split retainer rings 140 serve to retain the bearings within the tubular retainer 126.

A shoulder 142 is threaded onto the tubular shaft 110 directly over the bearing assembly. This latter shoulder serves as a support for the centrifuge head 34. The head 34 and a tapered collet 146 are held on the shoulder 142 by means of a locking nut 150 which is threaded to the collet. An annular member 152 may be threaded into the upper end of the locking nut 150. The annular member may be used to support a lid for the assembly. A plug 154 may be threaded into the end of the tubular shaft 110, and over the upper extremity of the spindle 102. The shoulder 142 also acts as a slinger to prevent liquids from entering the bearings 120.

A feature of the structure shown in FIG. 2 is that the spindle 102 may be removed therefrom without disturbing the entire assembly. This may be achieved, for example, by loosening the set screws 108 at the lower end of the spindle; and by removing the annular member 152 and the plug 154, and by loosening the nut 112 at the upper end of the spindle. The spindle 102 may then be withdrawn from the tubular shaft 110.

The embodiment of FIG. 3 is generally similar to the embodiment of FIG. 1, and like components have been designated by the same numbers. The slinger shoulder 142' in the assembly of FIG. 3 is generally similar to the shoulder 142 of the previous embodiment except that the shoulder 142' is in press-fit with the tubular shaft 110. In the embodiment of FIG. 3, the spindle 102 is attached at its upper end to the tubular shaft 110' by, for example, silver soldering, rather than by the arrangement described in conjunction with FIG. 2. In the latter embodiment, the rotor may be supported on the shoulder 142' by a fastener extending into the threaded upper extremity of the tubular shaft 110'.

The motor drive shaft 106 is supported in a bearing 200 which, in turn, is mounted on the motor frame 202. A tubular member 204 is supported on the motor frame in coaxial relationship with the spindle 102, but insulated from the motor frame and spindle by an insulated washer 206. The tubular member 204 may be made of brass or other appropriate electrical conductor.

An electric contact is made to the tubular member 204 by means, for example, of an electric lead 210 and contact screw 212. The tubular member is supported on the insulated washer 206 by means of a collar 220 and spring loaded screws 222. The screws may be formed of nylon, or other suitable insulating material.

Should the head of the centrifuge be loaded in a manner to unbalance the rotor in excess of a safe threshold, the resulting vibration causes the lower end of the tubular shaft 110' to contact and effectively "ground" the tubular member 204. The lead 210 may be connected to an appropriate control circuit such as shown in FIG. 4, so that any such grounding of the tubular member 204 causes the motor 30 to be de-energized and the rotor brought to a stop.

The control circuit of FiG. 4 includes, for example, a transformer 300 which has a secondary winding connected to the lead 210 and to the grounded casing of the motor 30. The primary winding of the transformer 300 is connected to one terminal of a suitable power source, and through the winding of a relay 302 to the other terminal of the power source. A reset switch 304 may also be included in the latter connection. One terminal of the power source is connected to the motor 30, and the other terminal is connected to a pair of normally closed contacts of the relay 302 to the other terminal of the motor. The relay 302 also includes a pair of normally open latching contacts which, when closed, cause the relay to be held closed by the closure of its normally open latching contact.

During normal operation of the system, the relay 302 is de-energized, and the motor 30 is energized through the normally closed contacts of the relay 302. However, when the conditions are such that the sleeve 204 is grounded, in the manner described above, the secondary winding of the transformer 300 is short-circuited, so that an increased current flows through the primary winding. This increased current energized the relay 302 causing its normally closed contacts to open, so that the motor 30 is de-energized. At the same time, the latching contacts of the relay 302 close, so that the relay remains energized, and the motor 30 remains de-energized, until the reset switch 304 is actuated.

It will be appreciated that other types of control circuits may be used to achieve the desired de-energizing of the motor 30. Also, other relay contacts may be incorporated into the relay 302, so as to activate alarm circuits, energize braking mechanisms for the motor 30, and so on.

It will be appreciated that although particular embodiments of the invention have been shown and described, modifications may be made. All modifications which come within the spirit and scope of the invention are intended to be covered by the following claims.

What is claimed is:

1. A rotatable rotor assembly comprising a frame; a motor mounted on said frame; a resilient spindle mechanically coupled to said motor and extending vertically upwardly therefrom to be rotatably driven thereby; a rotor; means for mounting said rotor on said spindle at the upper end thereof remote from said motor to be rotatably driven by said spindle; a tubular electrically conductive member mounted in fixed relationship with said frame and insulated therefrom, said tubular member extending upwardly along said spindle in coaxial relationship therewith but spaced radially therefrom; and electrical contact means mounted on the upper end of said spindle for engagement with said electrically conductive member when the radial deflection of said spindle exceeds a particular threshold.

2. The assembly defined in claim 1, and which includes a tubular drive shaft mounted on the upper end of said spindle and extending downwardly along said spindle in coaxial relationship therewith; a tubular bushing mounted on said frame and surrounding said spindle; bearing means for said spindle; and flexible sealing means mounting said bearing means to said bushing.

3. The assembly defined in claim 2, and which includes an annular shoulder member mounted on said tubular drive shaft above said sealing means and adjacent thereto for protecting said bearing means from liquids and serving as a support for said rotor.

4. The assembly defined in claim 2, in which said tubular drive shaft has a tapered thread at the upper extremity thereof, and which includes nut means engaging said tapered thread to produce a press-fit between the upper extremity of said tubular shaft and the upper extremity of said spindle.

5. The assembly defined in claim 2, in which said tubular drive shaft is attached at the upper extremity thereof to the upper extremity of said spindle.

6. The assembly defined in claim 2, in which said bearing means includes a tubular retainer having an annular shoulder thereon; and a resilient annular bumper member mounted on said annular shoulder.

7. The assembly defined in claim 2, in which said tubular electrically conductive member is positioned to be engaged by the lower end of said tubular drive shaft when the radial deflection of said spindle exceeds a particular threshold.

8. The assembly defined in claim 1, in which includes an electric control circuit connected to said tubular member and to said motor for de-energizing said motor upon the engagement of said electrical contact means with said electrically conductive tubular member.

9. The assembly defined in claim 8, in which said control circuit includes a transformer having a secondary winding connected across said tubular member and said electrical contact means to be short-circuited when said electrical contact means engages said tubular member, and which includes a latching relay circuit connected to the primary of said transformer for deenergizing said motor when said secondary winding is short-circuited, and for maintaining said motor de-energized until the control circuit is reset.

* * * * *